(12) United States Patent
    Qin

(10) Patent No.: US 12,022,141 B2
(45) Date of Patent: Jun. 25, 2024

(54) SAFE PLAYBACK METHOD FOR STREAMING MEDIA FILE, AND DISPLAY DEVICE

(71) Applicant: QINGDAO HISENSE MEDIA NETWORKS LTD., Shandong (CN)

(72) Inventor: Jingbo Qin, Shandong (CN)

(73) Assignee: QINGDAO HISENSE MEDIA NETWORKS LTD., Qingdao (CN)

( * ) Notice: Subject to any disclaimer, the term of this patent is extended or adjusted under 35 U.S.C. 154(b) by 42 days.

(21) Appl. No.: 17/807,220

(22) Filed: Jun. 16, 2022

(65) Prior Publication Data

US 2022/0312051 A1    Sep. 29, 2022

Related U.S. Application Data

(63) Continuation of application No. PCT/CN2020/108030, filed on Aug. 8, 2020.

(30) Foreign Application Priority Data

Jun. 11, 2020  (CN) .......................... 202010531490.3

(51) Int. Cl.
   *G06F 17/00*     (2019.01)
   *H04L 65/70*     (2022.01)
   (Continued)

(52) U.S. Cl.
   CPC ......... *H04N 21/2387* (2013.01); *H04L 65/70* (2022.05); *H04N 21/2347* (2013.01); *H04N 21/4405* (2013.01)

(58) Field of Classification Search
   CPC ........... H04N 21/2387; H04N 21/2347; H04N 21/4405; H04N 21/23476; H04N 21/42623; H04L 65/70; H04L 65/764
   (Continued)

(56) References Cited

U.S. PATENT DOCUMENTS

| 8,266,707 | B2 | 9/2012 | Savagaonkar et al. |
| 11,010,486 | B2 * | 5/2021 | Dyvadheenam .... H04L 63/0428 |

(Continued)

FOREIGN PATENT DOCUMENTS

| CN | 101729750 A | 6/2010 |
| CN | 102685592 A | 9/2012 |

(Continued)

OTHER PUBLICATIONS

Tsilimantos, Classifying flows and buffer state for YouTube's HTTP adaptive streaming service in mobile networks', 2018 Association for Computing Machinery, ACM (Year: 2018).*

(Continued)

*Primary Examiner* — Stephen S Hong
*Assistant Examiner* — Matthew J Ludwig
(74) *Attorney, Agent, or Firm* — ANOVA LAW GROUP, PLLC

(57) ABSTRACT

A play method for a streaming media file, and a display apparatus are provided. The method comprises: in response to a command for playing a streaming media file on a display of the display apparatus, obtaining the streaming media file and determining a state of the streaming media file; in response to the state of the streaming media file being encrypted state, flowing video data in the streaming media file into a trusted execution environment of the display apparatus, and determining a state of the video data in the trusted execution environment; and in response to the state of the video data being encrypted state, decrypting the video data, decoding the decrypted video data, and then playing the decoded video data.

12 Claims, 4 Drawing Sheets

(51) Int. Cl.
*H04N 21/2347* (2011.01)
*H04N 21/2387* (2011.01)
*H04N 21/4405* (2011.01)

(58) Field of Classification Search
USPC ........................................................ 715/231
See application file for complete search history.

(56) References Cited

U.S. PATENT DOCUMENTS

| | | | | |
|---|---|---|---|---|
| 11,308,185 | B1* | 4/2022 | Paczkowski | H04L 9/50 |
| 11,386,187 | B2* | 7/2022 | Morrow | G06F 21/57 |
| 11,477,036 | B2* | 10/2022 | Caceres | H04L 9/3247 |
| 11,741,221 | B2* | 8/2023 | Bursell | G06F 21/602 |
| | | | | 713/193 |
| 2005/0010531 | A1 | 1/2005 | Kushalnagar et al. | |
| 2006/0123484 | A1 | 6/2006 | Babic et al. | |
| 2009/0177793 | A1* | 7/2009 | Josa | H04L 63/10 |
| | | | | 380/42 |
| 2013/0047264 | A1* | 2/2013 | Bjorkengren | H04N 21/8355 |
| | | | | 726/27 |
| 2013/0198770 | A1* | 8/2013 | Xiong | H04N 21/25875 |
| | | | | 725/93 |
| 2014/0095890 | A1* | 4/2014 | Mangalore | G06F 21/60 |
| | | | | 713/189 |
| 2015/0229471 | A1 | 8/2015 | Nair et al. | |
| 2015/0294122 | A1* | 10/2015 | Verma | H04L 9/3234 |
| | | | | 713/193 |
| 2015/0302202 | A1* | 10/2015 | Yamamoto | G06F 21/577 |
| | | | | 726/25 |
| 2016/0253519 | A1* | 9/2016 | Broumas | H04L 9/0866 |
| | | | | 713/189 |
| 2016/0285870 | A1* | 9/2016 | Poornachandran | G06F 1/3287 |
| 2017/0005790 | A1* | 1/2017 | Brockmann | H04L 9/0897 |
| 2018/0014041 | A1* | 1/2018 | Chen | H04L 65/612 |
| 2018/0357394 | A1 | 12/2018 | Sheng et al. | |
| 2020/0296447 | A1* | 9/2020 | Chakraborty | H04N 21/4408 |
| 2021/0266329 | A1* | 8/2021 | Fuhry | H04L 63/083 |

FOREIGN PATENT DOCUMENTS

| | | | | |
|---|---|---|---|---|
| CN | 103873243 | A | 6/2014 | |
| CN | 104580652 | A | 4/2015 | |
| CN | 105072488 | A | 11/2015 | |
| CN | 105704515 | A | 6/2016 | |
| CN | 106104542 | A | 11/2016 | |
| CN | 107005402 | A | 8/2017 | |
| WO | WO-2019224241 | A1* | 11/2019 | H04N 21/237 |

OTHER PUBLICATIONS

Widevine, WideVine DRM Architecture Overview, Google confidential Version 1.2. Mar. 6, 2017 (Year: 2017).*
International Search Report, China International Search Authority, dated Mar. 3, 2021, from PCT/CN2020/108030.

* cited by examiner

SAFE PLAYBACK METHOD FOR STREAMING MEDIA FILE, AND DISPLAY DEVICE

CROSS REFERENCE TO RELATED APPLICATIONS

This application is a continuation application of International Application No. PCT/CN2020/108030 filed Aug. 8, 2020, which claims the priority of application No. CN202010531490.3, filed on Jun. 11, 2020, the entire contents of which are incorporated herein by reference.

FIELD

The disclosure relates to streaming media, in particular to a play method for a streaming media file, and a display apparatus.

BACKGROUND

With development of various smart devices and favorable network conditions, various streaming applications have appeared on the market, like Youtube and Google Play Movies. Compared with computers or smartphones, the experience of watching streaming media files on a smart TV is better, and especially for premium streaming media files of higher quality, users prefer to use the smart TV with a large screen and a clear view effect.

In addition, in order to provide streaming media files with copyright protection to the users in a more flexible manner, mixed encrypted streaming media files emerge based on the above requirement. The mixed encrypted streaming media files (or mixed streams for short) mean that in a streaming media file, both encrypted streams and unencrypted streams (or clear streams for short) are included. Such streaming media files are also copyrighted. The scenarios of this kind of streaming media files are also relatively common, such as: streaming media files that allow users to watch several minutes of video for free; streaming media files with fixed advertisements embedded in a video source; and streaming media files with trailer information in the end part.

However, when the mixed encrypted streaming media files are played, there is often screen frozen. Therefore, there is a need for a play method for a streaming media file which allows for smooth streaming without frozen during the playing of the streaming media file.

SUMMARY

The disclosure provides a play method for a streaming media file, and a display apparatus.

In a first aspect, a display apparatus is provided, including:
 a display;
 a user interface;
 a network component, configured to browse or download a streaming media file from a server;
 a decryption component configured to decrypt audio and video data contained in an encrypted streaming media file;
 a decoder configured to decode the audio and video data; and
 a controller in connection with the display, the user input interface, network component, decryption module and the decoder and configured to:

in response to a command for playing a streaming media file, obtain the streaming media file via the network component and determine a state of the streaming media file;
 in response to the state of the streaming media file being encrypted state, cause video data in the streaming media file to flow into a trusted execution environment in the display apparatus, and determine a state of the video data in the trusted execution environment; and
 in response to the state of the video data being encrypted state, send the video data to the decryption module for decryption, and send decrypted video data to the decoder for decoding, and control the display to play the decoded video data.

In some embodiments, the controller is further configured to: in response to the state of the streaming media file being not encrypted state, directly send the video data in the streaming media file to the decoder for decoding without sending the video data to the trusted execution environment; and control the display to play the decoded video data.

In some embodiments, the controller is further configured to: in response to the state of the video data being not encrypted state, send the video data to the decoder for decoding without sending the video data to the decryption module; and control the display to play the decoded video data.

In some embodiments, the controller is further configured to: determine whether the state of the streaming media file is encrypted state by determining whether the streaming media file sent from a browser in the display apparatus has DrmType information; and
 in response to the streaming media file having DrmType information, determine the state of the streaming media file is encrypted state;
 in response to the streaming media file not having DrmType information, determine the state of the streaming file is not encrypted state.

In some embodiments, the DrmType information is located in metadata of a media container file.

In some embodiments, the controller is further configured to: after determining the streaming media file is encrypted, send a request for a key management system associated with a key for encryption of the streaming media file to the server.

In some embodiments, the controller is further configured to: after determining the streaming media file has DrmType information, send DrmType information from the browser to a middleware of the display apparatus and save DrmType information in the middleware, and then cause the browser to send a request for downloading following streaming media file to the server, wherein the following media file comprises a series of data packets.

In some embodiments, the controller is further configured to: parse the series of data packets and determine whether the series of data packets have DrmInfo information.

In some embodiments, the controller is further configured to: in response to the series of data packets having DrmInfo information, determine the state of the video data is encrypted state; in response to the series of data packets not having DrmInfo information, determine the state of the video data is not encrypted state.

In some embodiments, the decryption module is configured in a middleware of the display apparatus, and the decoder is configured in a chip of the display apparatus.

A play method for a streaming media file on a display apparatus is provided, including:

in response to a command for playing a streaming media file on a display of the display apparatus, obtaining the streaming media file and determining a state of the streaming media file;

in response to the state of the streaming media file being encrypted state, flowing video data in the streaming media file into a trusted execution environment of the display apparatus, and determining a state of the video data in the trusted execution environment; and in response to the state of the video data being encrypted state, decrypting the video data in a decryption module of the display apparatus, decoding the decrypted video data in a decoding module of the display apparatus, and then playing the decoded video data.

In some embodiments, the method further includes: in response to the state of the streaming media file being not encrypted state, directly decoding the video data without sending the video data to the trusted execution environment; and playing the decoded video data.

In some embodiments, the method further includes: in response to the state of the video data being not encrypted state, decoding the video data; and playing the decoded video data.

In some embodiments, the method further includes: determining whether the state of the streaming media file is encrypted state by determining whether the streaming media file sent from a browser has DrmType information; determining the state of the streaming media file is encrypted state in response to the streaming media file having DrmType information; and determining the state of the streaming file is not encrypted state in response to the streaming media file not having DrmType information.

In some embodiments, the DrmType information is located in metadata of a media container file.

In some embodiments, the method further includes: after determining the streaming media file is encrypted, sending a request for a key management system associated with a key for encryption of the streaming media file to the server.

In some embodiments, the method further includes: after determining the streaming media file has DrmType information, sending DrmType information from the browser to a middleware of the display apparatus and saving DrmType information in the middleware, and then causing the browser to send a request for downloading following streaming media file to the server, wherein the following media file comprises a series of data packets.

In some embodiments, the method further includes: parsing the series of data packets and determining whether the series of data packets have DrmInfo information.

In some embodiments, the method further includes: in response to the series of data packets having DrmInfo information, determining the state of the video data is encrypted state; in response to the series of data packets not having DrmInfo information, determining the state of the video data is not encrypted state.

In some embodiments, the decryption module is configured in a middleware of the display apparatus, and the decoder is configured in a chip of the display apparatus.

DETAILED DESCRIPTION OF THE EMBODIMENTS

In order to make the objectives, embodiments and advantages of the disclosure clearer, the exemplary embodiments of the disclosure will be described clearly and completely in combination with the accompanying drawings of the exemplary embodiments of the disclosure. Apparently, the described exemplary embodiments are some, but not all, embodiments of the disclosure.

Based on the exemplary embodiments of the disclosure, all other embodiments obtained by those ordinarily skilled in the art without involving any inventive effort are within the protection scope of the disclosure.

Figure 1A:
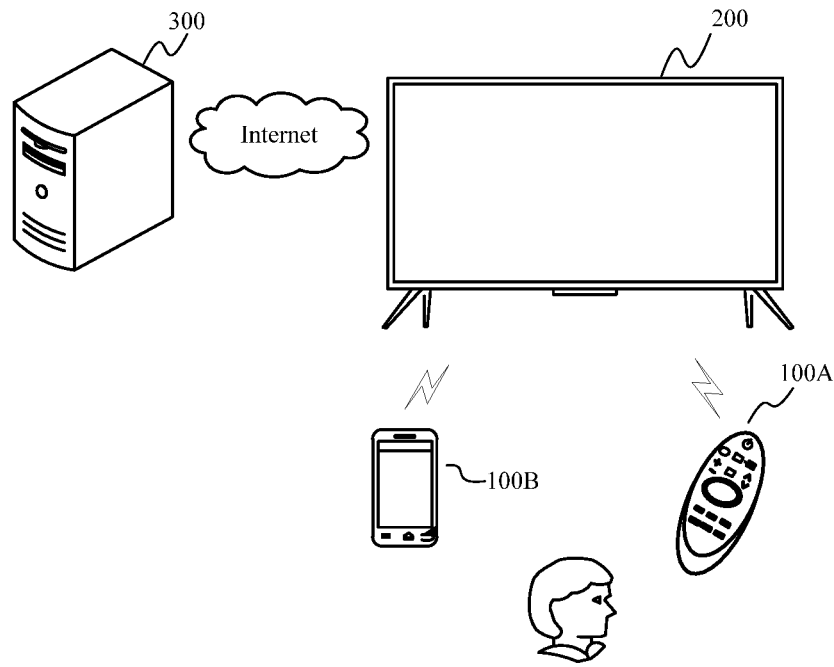
FIG. 1A illustrates a schematic diagram of a scenario between a display apparatus and a control device.

FIG. 1A shows a schematic diagram of a scenario between a display apparatus 200 and a control device 100. As shown in FIG. 1A, communication between the control device 100 and the display apparatus 200 may be performed in a wired or wireless manner.

The control device 100 is configured to control the display apparatus 200, may receive a command input from a user and convert the command into an instruction which can be recognized and responded by the display apparatus 200, and plays an interaction intermediary role between the user and the display apparatus 200.

The control device 100 may be a remote control 100A, including infrared protocol communication or Bluetooth protocol communication and other short-distance communication modes, and the display apparatus 200 is controlled in wireless or other wired modes. The user may control the display apparatus 200 by inputting a user command through keys on the remote control, voice input, control panel input and the like. For example: the user may realize the function of controlling the display apparatus 200 by inputting control commands through a volume up/down key, a channel control key, an up/down/left/right direction key, a voice input key, a menu key, a power key and the like on the remote control.

The control device 100 may also be an intelligent device, such as a mobile terminal 100B, a tablet computer, a computer, and a notebook computer. For example, an application running on the intelligent device is configured to control the display apparatus 200. Through configuration, the application may provide various control for the user on a screen associated with the intelligent device through an intuitive user interface (UI).

Exemplarily, software applications may be installed on both the mobile terminal 100B and the display apparatus 200 to realize connection and communication through a network communication protocol, and further achieve the purposes of one-to-one control operations and data communication. For example: the mobile terminal 100B and the display apparatus 200 may be made to establish a control command protocol, and by operating various function keys or virtual buttons of a user interface provided on the mobile terminal 100B, the functions of physical keys on the remote control 100A may be realized. Audio and video contents displayed on the mobile terminal 100B may also be transmitted to the display apparatus 200 to realize a synchronous display function.

The display apparatus 200 may be implemented as a TV, and capable of providing a broadcast receiving and a network TV function that a computer supports. Examples of the display apparatus include digital TVs, Internet TVs, smart TVs, Internet Protocol TVs (IPTVs), and the like.

The display apparatus 200 may be a liquid crystal display, an OLED display or a projection display apparatus. The specific display apparatus type, size, resolution and the like are not limited.

The display apparatus 200 further performs data communication with a server 300 through a plurality of communication modes. Here, the display apparatus 200 may be allowed to perform communication through a local area network (LAN), a wireless local area network (WLAN) or the other networks. The server 300 may provide various contents and interactions for the display apparatus 200. Exemplarily, the display apparatus 200 may send and receive information, such as receiving electronic program guide (EPG) data, receiving software updates, or accessing a remotely stored digital media library. The server 300 may be one or more types of servers. Other network service contents such as video-on-demand and advertising services are provided through the server 300.

Figure 1B:
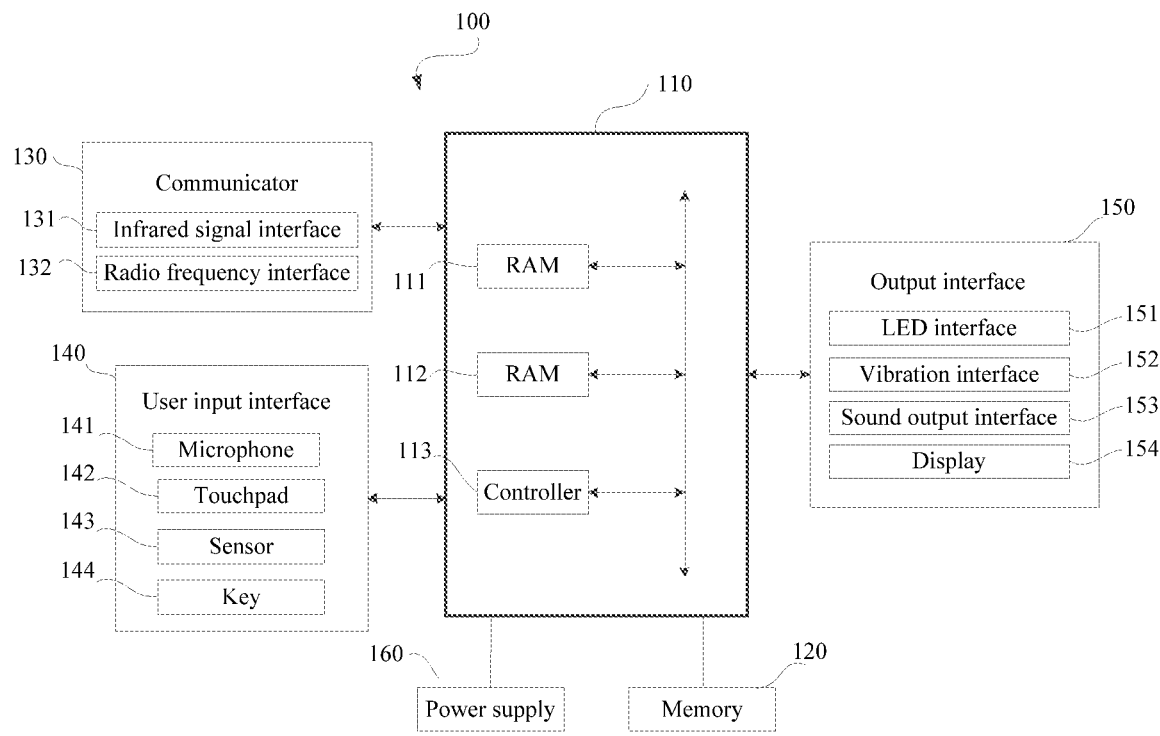
FIG. 1B illustrates a configuration block diagram of the control device 100 in FIG. 1A.

FIG. 1B shows a configuration block diagram of the control device 100. As shown in FIG. 1B, the control device 100 includes a controller 110, a memory 120, a communicator 130, a user input interface 140, an output interface 150 and a power supply 160.

The controller 110 includes a random access memory (RAM) 111, a read only memory (ROM) 112, a processor 113, a communication interface and a communication bus. The controller 110 is configured to control running and operations of the control device 100, communication cooperation between all internal components, and external and internal data processing functions.

Exemplarily, when an interaction from the user like pressing a key arranged on the remote control 100A or an interaction like touching a touch panel arranged on the remote control 100A is detected, the controller 110 may control to generate a signal corresponding to the detected interaction, and the signal is sent to the display apparatus 200.

The memory 120 is configured to store various running programs, data and applications for driving and controlling the control device 100 under the control of the controller 110. The memory 120 may store various control signal commands input from a user.

Under control of the controller 110, the communicator 130 realizes communication of a control signal and a data signal with the display apparatus 200. For example: the control device 100 sends a control signal (such as a touch signal or a button signal) to the display apparatus 200 via the communicator 130, and the control device 100 may receive the signal sent from the display apparatus 200 via the communicator 130. The communicator 130 may include an infrared signal interface 131 and a radio frequency signal interface 132. For example: for the infrared signal interface, a command input from the user needs to be converted into an infrared control signal according to an infrared control protocol and then the infrared control signal is sent to the display apparatus 200 through an infrared sending module.

For another example: for radio frequency signal interface, the command input from the user needs to be converted into a digital signal, and after being modulated according to a radio frequency control signal modulation protocol, the digital signal is sent to the display apparatus 200 via a radio frequency transmission module.

The user input interface 140 may include at least one of a microphone 141, a touch pad 142, a sensor 143, a key 144, etc., so that the user can input the commands for controlling the display apparatus 200 to the control device 100 through voice, touch, gesture, press, etc.

The output interface 150 outputs the command received from the user input interface 140 to the display apparatus 200, or outputs an image or voice signal received from the display apparatus 200. Here, the output interface 150 may include an LED interface 151, a vibration interface 152 that generates vibration, a sound output interface 153 that outputs sound, a display 154 that outputs images, and the like. For example, the remote control 100A may receive output signals such as audio, video or data from the output interface 150, and display the output signals in the form of images on the display 154, output the signals in the form of audio via the sound output interface 153, or output the signals in the form of vibration via the vibration interface 152.

The power supply 160 is configured to provide power support for all elements of the control device 100 under the control of the controller 110. The form of the power supply may be a battery or a relevant control circuit.

Figure 1C:
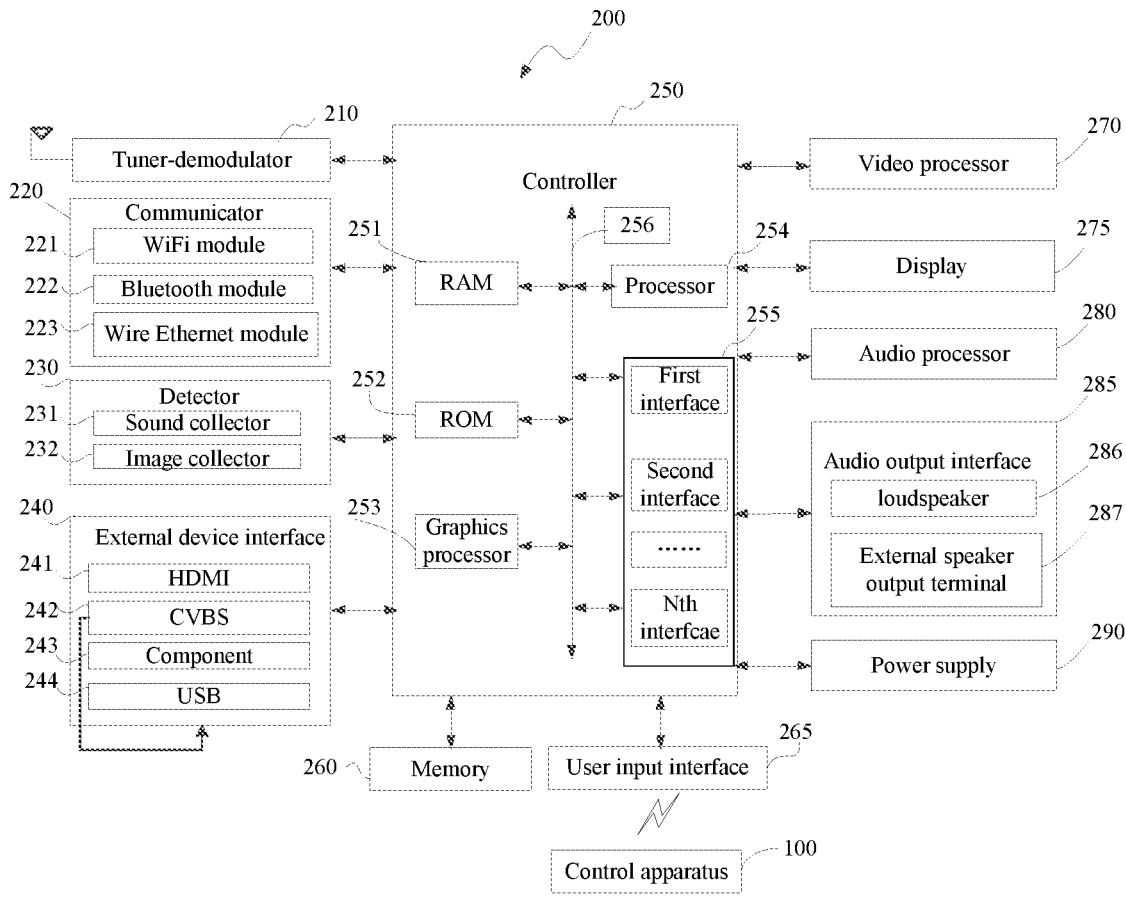
FIG. 1C illustrates a configuration block diagram of the display apparatus 200 in FIG. 1A.

FIG. 1C shows a hardware configuration block diagram of the display apparatus 200. As shown in FIG. 1C, the display apparatus 200 may further include a tuning demodulator 210, a communicator 220, a detector 230, an external apparatus interface 240, a controller 250, a memory 260, a user input interface 265, a video processor 270, a display 275, an audio processor 280, an audio output interface 285 and a power supply 290.

The tuning demodulator 210 receives broadcast TV signals in a wired or wireless mode, and may perform modulation and demodulation processing such as amplification, frequency mixing and resonance, so as to demodulate audio and video signals carried in a frequency of a TV channel selected by the user from a plurality of wireless or wired broadcast TV signals, and additional information (such as EPG data).

The tuning demodulator 210 is controlled by the controller 250 according to user's selection to respond to the frequency of the TV channel selected by the user and a TV signal carried by the frequency.

The tuning demodulator 210 may receive signals in many ways according to different broadcasting standards of the TV signal, such as: terrestrial broadcasting, cable broadcasting, satellite broadcasting or Internet broadcasting; according to different modulation types, a digital modulation or analog modulation mode may be used; and according to different types of TV signals, analog signals and digital signals may be demodulated.

In some embodiments, the tuning demodulator 210 may also be in an external device, such as an external set-top box. In this way, the set-top box outputs the TV signal after modulation and demodulation, and the TV signal is input into the display apparatus 200 through the external apparatus interface 240.

The communicator 220 is a component configured to communicate with an external device or an external server according to various communication protocol types. For example, the display apparatus 200 may transmit content data to the external device connected via the communicator 220, or browse and download the content data from the external device connected via the communicator 220. The communicator 220 may include a network communication protocol module or a near field communication protocol module such as a WIFI module 221, a Bluetooth module 222, and a wired Ethernet module 223, so that the communicator 220 can receive the control signal from the control device 100 according to the control of the controller 250, and the control signal is realized as a WIFI signal, a Bluetooth signal, a radio frequency signal, etc.

The detector 230 is a component configured to collect signals of an external environment or signals interacted with the outside for the display apparatus 200. The detector 230 may include a sound collector 231, an image collector 232, such as a camera.

In some embodiments, the detector 230 may further include a temperature sensor, for example, by sensing an environment temperature, the display apparatus 200 may adaptively adjust a display color temperature of the image.

In some embodiments, the detector 230 may further include a sound collector, such as a microphone, which may be configured to receive a user's voice, such as a voice signal of the user's command for controlling the display apparatus 200; or the sound collector may collect environment sound configured to recognize environment scene types, so that the display apparatus 200 may be adaptive to environment noise.

The external device interface 240 is a component that provides the controller 210 to control data transmission between the display apparatus 200 and the external device. The external apparatus interface 240 may be connected with the external device such as the set-top box, a game device, and a notebook computer in a wired/wireless manner, and may receive data such as video signals (such as moving images), audio signals (such as music), and additional information (such as EPG)) of the external device.

The external device interface 240 may include one or more of a high-definition multimedia interface (HDMI) 241, a composite video blanking and sync (CVBS) interface 242, an analog or digital component interface 243, a universal serial bus (USB) interface 244, a component terminal (not shown in the figure), or red, green and blue (RGB) interface (not shown in the figure).

The controller 250 controls the display apparatus 200 to work and responds to user's operations by operating various software programs (such as an operating system and various applications) stored on the memory 260.

As shown in FIG. 1C, the controller 250 includes a random access memory (RAM) 251, a read only memory (ROM) 252, a graphics processor 253, a processor 254, a communication interface 255, and a communication bus 256. The RAM 251, the ROM 252, the graphics processor 253, the processor 254 and the communication interface 255 are connected via the communication bus 256.

The graphics processor 253 is configured to generate various graphic objects, such as an icon, an image and a menu. The graphics processor 253 may include an arithmetic unit, configured to perform operations by receiving various interactive commands input from the user, thereby displaying various objects according to display attributes; and the graphics processor 253 may include a renderer, configured to generate various objects obtained based on the arithmetic unit, and display a render result on the display 275.

The processor 254 is configured to run the operating system and application instructions stored in the memory 260, and run various applications, data and content processing according to the commands input from users, so as to finally display and play various audio and video contents.

In some embodiments, the processor 254 may include a plurality of processors. The plurality of processors may include a main processor and one or more sub-processor. The main processor is configured to perform some initialization operations of the display apparatus 200 in a preloading mode, and/or an operation of displaying a picture in a normal mode. The one or more sub-processor is configured to perform an operation in a state such as a standby mode of the display apparatus.

The communication interface 255 may include a first interface to an $n^{th}$ interface. These interfaces may be network interfaces connected with external devices via network.

The controller 250 may control an overall operation of the display apparatus 200. For example: in response to receiving a user input command for selecting a GUI object displayed on the display 275, the controller 250 may perform operations related to an object selected by the user input command.

The memory 260 is configured to store various types of data, software programs or applications that drive and control the operation of the display apparatus 200. The memory 260 may include a volatile and/or nonvolatile memory. The term "memory" includes the memory 260, the RAM 251 and ROM 252 of the controller 250, or a memory card in the display apparatus 200.

In some embodiments, the memory 260 is configured to store programs for driving the controller 250 in the display apparatus 200, store various applications built in the display apparatus 200 and downloaded by the user from the external device, and store various GUIs, various GUI-related objects, visual effect images of selectors configured to select GUI objects and other data provided by the display 275.

In some embodiments, the memory 260 is configured to store drive programs and related data of the tuning demodulator 210, the communicator 220, the detector 230, the external apparatus interface 240, the video processor 270, the display 275, the audio processor 280 and the like, external data (such as audio and video data) received from the external apparatus interface or user data (such as key information, voice information, and touch information) received from the user interface.

In some embodiments, kernel may control or manage system resources, as well as functions implemented by other programs (such as middleware, APIs or applications); and at the same time, the kernel may provide interfaces to allow the middleware, APIs or applications to have access to the controller so as to control or manage the system resources.

Figure 1D:
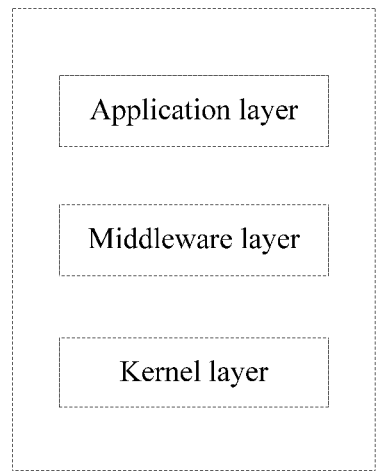
FIG. 1D illustrates a block diagram of architecture configuration of an operating system in a memory of a display apparatus 200.

FIG. 1D shows a block diagram of architecture configuration of the operating system in the memory of the display apparatus 200. The operating system architecture comprises an application layer, a middleware layer and a kernel layer.

For the application layer, built-in applications in the system, and non-system-level applications are in the application layer, which is responsible for direct interaction with the user. The application layer may include a plurality of applications, such as NETFLIX applications, settings applications, media center applications, etc. These applications may be implemented as web applications that execute based on a WebKit engine, and particularly may be developed and executed based on HTML, Cascading Style Sheets (CSS), and JavaScript.

Here, HTML, short for HyperText Markup Language, is a standard markup language configured to create web pages. Web pages are described by markup tags. HTML tags are configured to describe text, graphics, animations, sounds, tables, links, etc., and a browser will read an HTML document, interpret the content of the tags in the document, and display it in the form of a web page.

CSS, short for Cascading Style Sheets, is a computer language configured to describe the style of HTML files, and may be a language configured to define style structures, such as fonts, colors, positions, etc. CSS styles may be directly stored in the HTML web page or in separate style files to control the styles in the web page.

JavaScript is a language used in Web page programming, which may be inserted into the HTML web page and interpreted and executed by the browser. The interaction logic of the Web applications may be implemented by JavaScript. JavaScript may package a JavaScript extension interface through the browser to communicate with the kernel layer.

The middleware layer may provide some standardized interfaces to support the operation of various environments and systems. For example, the middleware layer may be implemented as Multimedia and Hypermedia Information Coding Experts Group (MHEG) for data broadcasting related middleware, DLNA middleware for external device communication, and also middleware for providing a browser environment in which an application in the display apparatus runs.

The kernel layer provides core system services, such as file management, memory management, process management, network management, and system security authorization management. The kernel layer may be implemented as a kernel based on various operating systems, for example, a kernel based on a Linux operating system.

The kernel layer also provides communication between system software and hardware, and provides device driver services for various hardwares, such as: providing a drive program for the display, a drive program for a camera, a button drive program for the remote control, a WiFi drive program for a WIFI module, an audio drive program for the audio output interface, a power management driver for a power management (PM) module, etc.

The user input interface 265 receives various interactions. Specifically, the user interface is configured to send an input signal from the user to the controller 250, or to transmit an output signal from the controller 250 to the user. Exemplarily, the remote control 100A may send input signals input from the user, such as power signals, channel selection signals, and volume adjustment signals, to the user interface 265, and then the user interface 265 forwards the signals to the controller 250; or, the remote control 100A may receive output signals processed by the controller 250 and output from the user interface 265, such as audio, video or data, and displays the output signals received or outputs the output signals received in the form of audio or vibration.

In some embodiments, the user may input a command on a graphics user interface (GUI) shown on the display 275, and the user interface 265 receives the command input from the user through the GUI. Specifically, the user interface 265 may receive a command configured to control the position of selectors in the GUI to select different objects or items.

Alternatively, the user may input a command by inputting specific sound or gestures, and the user interface 265 recognizes the sound or gestures through a sensor to receive the command.

The video processor 270 is configured to receive an external video signal, and perform video data processing such as decompression, decoding, scaling, noise reduction, frame rate conversion, resolution conversion, and image synthesis according to a standard encoding and decoding protocol of the input signal, and may obtain a video signal that is displayed or played directly on the display 275.

The video processor 270 includes a demultiplexing module, a video decoding module, an image synthesizing module, a frame rate converting module, a display formatting module and the like.

The demultiplexing module is configured to demultiplex input audio and video data streams. If an MPEG-2 stream (based on the compression standard of digital storage media motion Image and voice) is input, the demultiplexing module will demultiplex it as a video signal and an audio signal, etc.

The video decoding module is configured to process the demultiplexed video signal, including decoding, scaling, etc.

The image synthesizing module, such as an image synthesizer, is configured to superimpose and mix a GUI signal generated by the graphics generator according to the user's input or itself, and a scaled video image, so as to generate an image signal that may be displayed.

The frame rate converting module is configured to convert the frame rate of the input video, such as converting the frame rate of the input 60 Hz video to a frame rate of 120 Hz or 240 Hz, and this is usually implemented by means of frame interpolation.

The display formatting module is configured to change the signal output from the frame rate converting module into a signal conforming to a display format such as the display, such as converting the format of the signal output from the frame rate converting module to output an RGB data signal.

The display 275 is configured to receive the image signal output from the video processor 270 to display the video, image and a menu manipulation interface. For example, the display may present video from a broadcast signal received via the tuning demodulator 210, may also display video input from the communicator 220 or the external apparatus interface 240, and may also display images stored in the memory 260. The display 275 shows a user control interface UI which is produced in the display apparatus 200 and configured to control the display apparatus 200.

The display 275 may include a panel component configured to present a picture and a driving component driving image displaying. Or, the display 275 is a projection display and may further include a projection apparatus and a projection screen.

The audio processor 280 is configured to receive an external audio signal, and perform audio data processing such as decompressing, decoding, noise reduction, digital-to-analog conversion, and amplifying processing according to the standard encoding and decoding protocol of the input signal, so as to obtain an audio signal that may be played in a loudspeaker 286.

The audio processor 280 may support various audio formats, for example, MPEG-2, MPEG-4, Advanced Audio Coding (AAC), High Efficiency AAC (HE-AAC) and other formats.

The audio output interface 285 is configured to receive the audio signal output from the audio processor 280. For example, the audio output interface may output audio in the broadcast signals received via the tuning demodulator 210, audio input via the communicator 220 or the external device interface 240, and audio stored in the memory 260. The audio output interface 285 may include the loudspeaker 286, or an external audio output terminal 287, such as an headphone output terminal, which is output to a voice device of the external device.

In some embodiments, the video processor 270 may be included in one or more chips. The audio processor 280 may also be included in one or more chips.

In some embodiments, the video processor 270 and the audio processor 280 may be separate chips, or may be integrated with the controller 250 in one or more chips.

The power supply 290 is configured to provide power support for the display apparatus 200 with the power input from an external power supply under the control of the controller 250. The power supply 290 may be a built-in power supply circuit installed in the display apparatus 200, or a power source installed outside the display apparatus 200.

Figure 2:
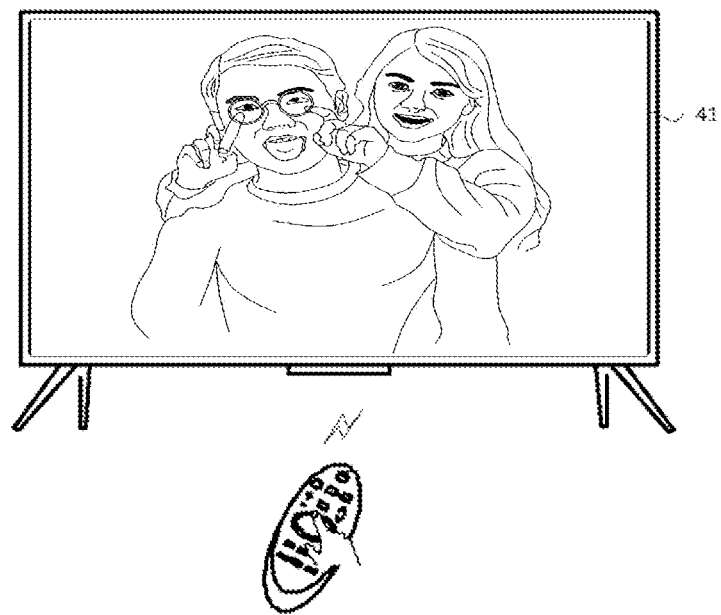
FIG. 2 illustrates a schematic diagram of a GUI provided by a display apparatus 200.

When a user uses the display apparatus to watch a mixed encrypted streaming media file, the user often finds that the picture is stuck in the play process. FIG. 2 shows a schematic diagram of a GUI provided by the display apparatus 200. As shown in FIG. 2, the GUI includes a play interface 41 for a streaming media file.

Figure 3:
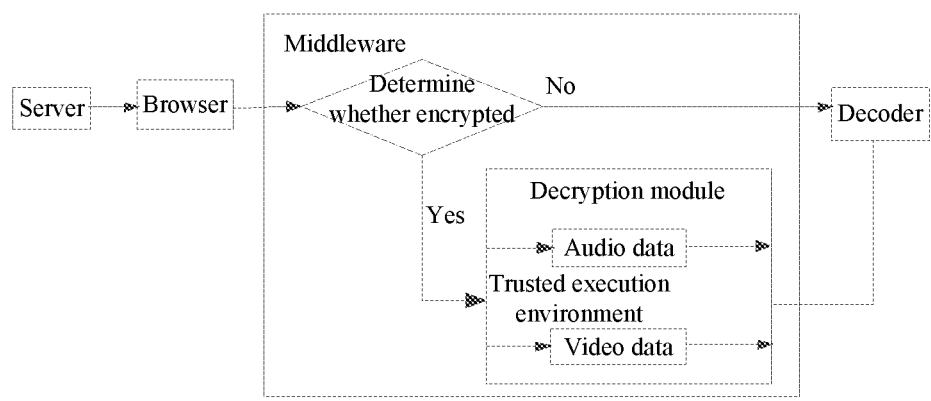
FIG. 3 illustrates a processing flow of a streaming media file when playing a pure encrypted streaming media file.

FIG. 3 is a processing process of a streaming media file when playing the pure encrypted streaming media file. The processing process of the streaming media file includes: a browser in the display apparatus sends a request for streaming media file to a server, and the server sends a corresponding streaming media file according to the request to the browser. The browser may be a Cobalt browser, and the browser itself may have a standard Encrypted Media Extensions (EME), which is configured to support play of a copyrighted streaming media file.

When the browser obtains the streaming media file, the browser caches the streaming media file, and then processes the streaming media file through middleware in the display apparatus. The middleware first determines whether the streaming media file is encrypted. If the streaming media file is unencrypted, it will be directly passed to a decoder for decoding and playing, wherein the decoder may be a decoder configured in a chip of the display apparatus; and if the streaming media file is encrypted, the streaming media file will be sent to a decryption component for decryption in the middleware, and then the decryption module sends the decrypted streaming media file to the decoder for decoding and playback after being decrypted by the decoding module.

Figure 4:
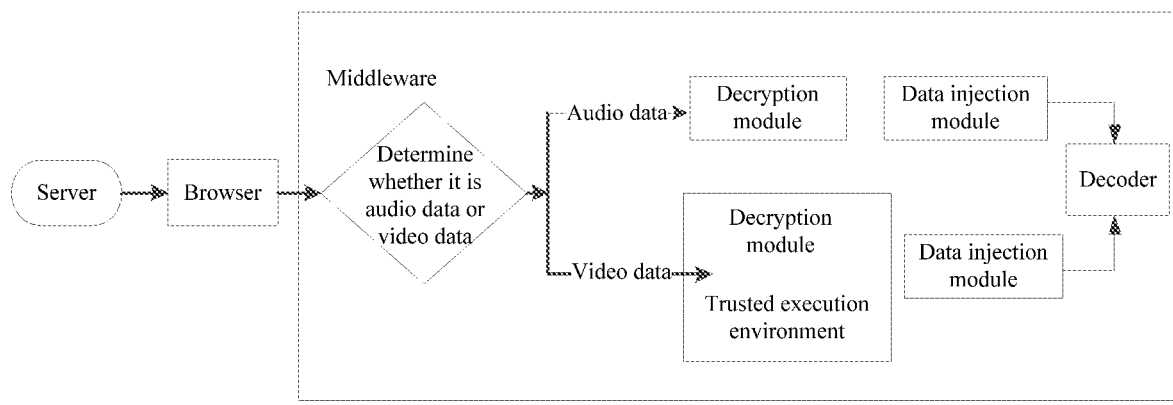
FIG. 4 illustrates a processing flow of another streaming media file.

It should be noted that the process of the browser transmitting the streaming media file to the middleware comprises that the browser first demultiplexes the streaming media file into video data and audio data, and transmits the video data and the audio data to the middleware independently. As shown in FIG. 4, since the protection levels of the video data and the audio data are different, if the streaming media file is encrypted, the audio data may be decrypted directly in the decryption module in the middleware, the protection level of the video data is higher, if the streaming media file is encrypted, the video data first enters a Trusted Execution Environment (TEE), and then is decrypted by the decryption module, and then the decrypted video data is sent to the decoder for decoding and the decoded video data is played by the display.

It should be noted that the TEE provides a secure region within a connected device, ensuring that sensitive data is stored, processed, and protected in an isolated and trusted environment. Peer-to-peer security is achieved by providing isolated and securely executed authorized software. In other words, the TEE may provide a region that is isolated from other modules and capable of executing trusted applications.

From the perspective of copyright security, like the pure encrypted streaming media file, video data in a mixed encrypted streaming media file also needs to be processed in the more secure TEE.

For playing of the mixed encrypted streaming media file, problems will occur according to the processing flow shown in FIG. 3. For example, if a first section of the mixed stream is a secret or encrypted stream, the video data will enter the TEE and be decrypted by the decryption module, while for a second section of the mixed stream after the first section is a clear stream, it will not enter the TEE for decryption. Generally the decryption of the video data of the same streaming media file are required to be performed in the same environment, that is, if TEE is required, all video data needs to be entered into the TEE, and if a non-TEE environment is OK, all video data should be processed in a non-TEE environment. This switch between the TEE and the non-TEE environment will cause the decoder not be able to read the video data, unable to continue decoding the data, thereby causing frozen video picture. As discussed above, the decoder is configured in the chip and used for decoding the video data after the video data are decrypted in the decryption module in the middleware layer. When a player of a chip platform in the display apparatus is initialized, the streaming media file is classified into encryption type and non-encryption type. Whether the data is processed according to the processing for a pure secret stream or the processing for a pure clear stream, it will cause the decoder to fail to read data that needs to be decoded when processing the mixed stream.

The embodiments of the disclosure provide a method for playing a streaming media file, which can prevent the problem of not being able to read the data that needs to be decoded when processing a mixed stream, so that a display apparatus will not have frozen images when playing mixed streaming media file.

Figure 5:
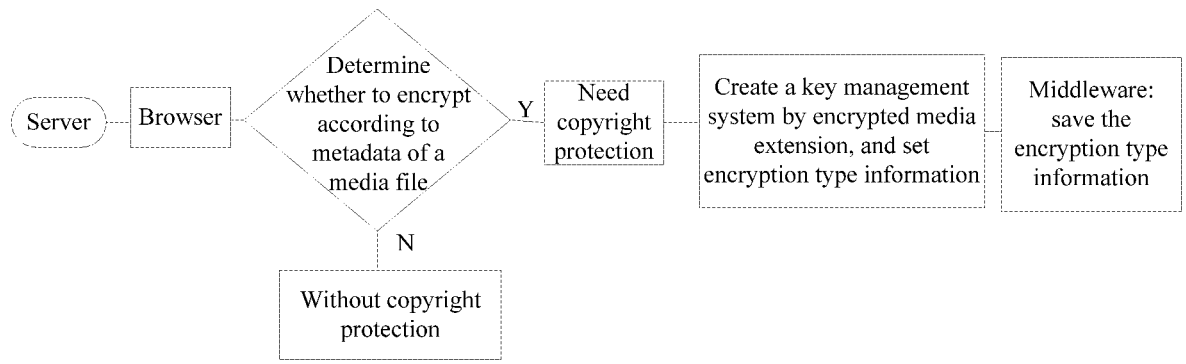
FIG. 5 illustrates a processing flow of another streaming media file.

When streaming media files are released online, they all have specified packaging formats. As shown in FIG. 5, the information for indicating whether the streaming media file is encrypted is located in metadata of a media container file. If the streaming media file is encrypted, the browser will request for a key management system (KeySystem) associated with a key via Encrypted Media Extensions (EME), and configure a DRM scheme used for decryption according to the capabilities of the chip platform in the display apparatus, and the DRM scheme is indicated by DrmType (i.e., encryption type information). For example, the DrmType may be Widevine, or PlayReady. It should be noted that the key management system is used for communication with a key management server, and plays a role in applying for a decryption key for the streaming media file.

The DrmType is transmitted by the browser to the middleware for being saved in the middleware. After the middleware saves the DrmType, an instruction for downloading the streaming media file is sent to the browser, and the browser sends a request for obtaining following streaming media file to the server. The following streaming media file comprises a series of data packets, and the information of the data packets includes media type, size, time stamp, encoding standard, frame rate, resolution, encryption information, and the like. The middleware may parse the information of the data packets, and determine whether the data packets include encrypted information, and the encrypted information is identified by DrmInfo (encrypted identification information) field.

Figure 6:
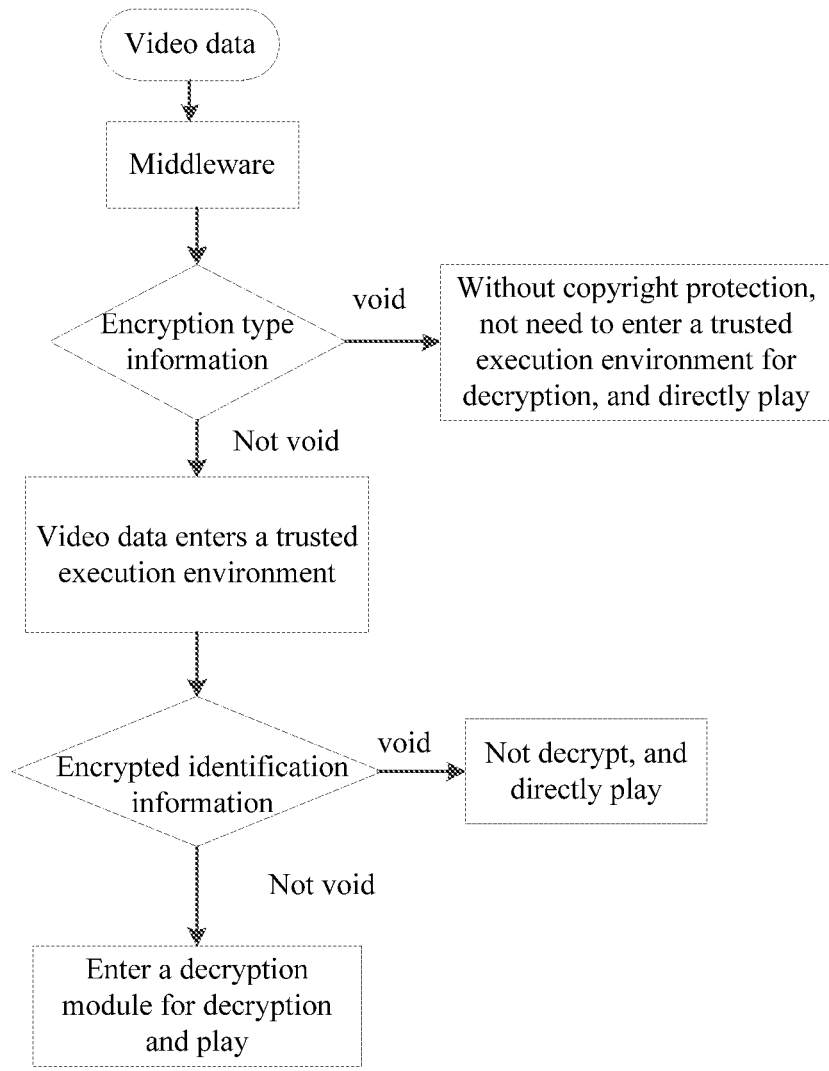
FIG. 6 illustrates a processing flow of another streaming media file.

When processing the mixed stream with copyright protection, the processing of the mixed stream is performed in the following manner, as shown in FIG. 6.

The middleware first determines whether the DrmType of the streaming media file is void. If it is void, it means that the mixed stream is not encrypted and has no copyright protection, the video data does not need to enter the TEE and the decryption module, and the video data is sent to the decoder directly for being decoding and then being played. If it is not void, it means that the mixed stream is encrypted and the streaming media file has copyright protection, the video data enters the TEE. Then whether the video data needs to be decrypted according to the DrmInfo information parsed from each packet of data is determined. If the DrmInfo field is not void, the video data enters the decryption module for being decrypted, and then is decoded via the decoder and then the decoded video is played on the display. If the DrmInfo is void, the video data does not need to enter the decryption module for being decrypted, and directly enters the decoder for decoding and then the decoded video data is played on the display.

Accordingly, the processing flow includes:
1) determining whether the DrmType field is void first;
    1.1) if the DrmType is void, the streaming media file has no copyright protection requirement, and the streaming media file is directly being decoded in the decoder and the decoded data is being played; and
    1.2) if the DrmType is not void, the video data is processed in the TEE.
2) determining whether the DrmInfo field is void;
    2.1) If the DrmInfo is void, the video data is not encrypted, does not need to be decrypted, and is directly decoded in the decoder and then the decoded video data is played; and
    2.2) If the DrmInfo is not void, the video data is encrypted, and needs to enter the decryption module for decryption and the decrypted video data is decoded and played.

The embodiments of the disclosure determines whether the mixed stream enters the TEE and whether it enters the decryption module for decryption according to the metadata information of the streaming media file and the DRM scheme adopted by the key management system created via the browser EME, so as to ensure normal playback of the mixed stream. The method is simple and easy to implement and does not depend on specific chip platforms or browsers, and has good compatibility. By setting the conditions for the video data to enter the TEE and the decryption module for decryption, the video data reading failure and frozen image issue can be avoided when the video data enters the underlying player to decode the mixed stream.

In the above embodiments, according to the play method for the streaming media file and the display apparatus, the display apparatus will not have frozen image when playing the mixed streaming media file. The method includes: determining the state of the streaming media file in response to a command for playing the streaming media file input from a user, wherein the streaming media file comprises video data and audio data; if the state of the streaming media file is encrypted state, controlling the video data in the streaming media file to flow into a trusted execution environment configured in the display apparatus, and determining the state of the video data in the trusted execution environment; and if the state of the video data is encrypted state, sending the video data to a decryption module in the middleware for decryption, sending the decrypted video data to a decoder for decoding, and controlling a display of the display apparatus to play the decoded video data.

Although the disclosure has been described in detail with reference to the above embodiments, those ordinarily skilled in the art should understand that: they can still modify the above embodiments or substitute some or all of the elements; and these modifications or substitutes do not depart from the scope of the embodiments of the disclosure.

What is claimed is:
1. A display apparatus, comprising:
    a display;
    a user input interface;
    a network component configured to obtain a streaming media file from a server;
    a decryption module configured to decrypt video data and/or audio data in the streaming media file;
    a decoder configured to decode video data and/or audio data in the streaming media file; and
    a controller in connection with the display, the user input interface, the network component, the decryption module and the decoder, and configured to:
        in response to a command for playing a streaming media file, obtain the streaming media file via the network component and determine a state of the streaming media file;
        in response to the state of the streaming media file being encrypted state, cause video data in the streaming media file to flow into a trusted execution environment in the display apparatus, and determine a state of the video data in the trusted execution environment; and in response to the state of the video data being encrypted state, send the video data to the decryption module for decryption, and send decrypted video data to the decoder for decoding, and control the display to play the decoded video data;
    wherein the controller is further configured to:
        determine whether the streaming media file sent from a browser in the display apparatus includes DrmType information;
        in response to the streaming media file including the DrmType information, determine the state of the streaming media file being the encrypted state;
        in response to the streaming media file not including the DrmType information, determine the state of the streaming file is not encrypted state;
        after determining the streaming media file includes the DrmType information, send the DrmType information from the browser to a middleware of the display apparatus and save the DrmType information in the middleware, and cause the browser to send a request for downloading a following streaming media file to the server,
        wherein the following media file comprises a series of data packets;
        parse the series of data packets and determine whether the series of data packets includes DrmInfo information;
        in response to the series of data packets including the DrmInfo information, determine the state of the video data is the encrypted state; and
        in response to the series of data packets not including the DrmInfo information, determine the state of the video data is not encrypted state.
2. The display apparatus according to claim 1, wherein the controller is further configured to:

in response to the state of the streaming media file being not encrypted state, directly send the video data in the streaming media file to the decoder for decoding without sending the video data to the trusted execution environment; and control the display to play the decoded video data.

3. The display apparatus according to claim 1, wherein the controller is further configured to:
in response to the state of the video data being not encrypted state, send the video data to the decoder for decoding without sending the video data to the decryption module; and control the display to play the decoded video data.

4. The display apparatus according to claim 1, wherein the DrmType information is located in metadata of a media container file.

5. The display apparatus according to claim 1, wherein the controller is further configured to:
after determining the streaming media file is encrypted, send a request for a key management system associated with a key for encryption of the streaming media file to the server.

6. The display apparatus according to claim 1, wherein the decryption module is configured in the middleware of the display apparatus, and the decoder is configured in a chip of the display apparatus.

7. A play method for a streaming media file on a display apparatus, comprising:
in response to a command for playing a streaming media file on a display of the display apparatus, obtaining the streaming media file and determining a state of the streaming media file;
in response to the state of the streaming media file being encrypted state, flowing video data in the streaming media file into a trusted execution environment of the display apparatus, and determining a state of the video data in the trusted execution environment; and
in response to the state of the video data being encrypted state, decrypting the video data in a decryption module of the display apparatus, decoding the decrypted video data in a decoding module of the display apparatus, and then playing the decoded video data,
the method further comprising:
determining whether the streaming media file sent from a browser in the display apparatus includes DrmType information;
in response to the streaming media file including the DrmType information, determining the state of the streaming media file being the encrypted state;
in response to the streaming media file not including the DrmType information, determining the state of the streaming file is not encrypted state;
after determining the streaming media file includes the DrmType information, sending the DrmType information from the browser to a middleware of the display apparatus and saving the DrmType information in the middleware, and causing the browser to send a request for downloading a following streaming media file to the server,
wherein the following media file comprises a series of data packets;
parsing the series of data packets and determining whether the series of data packets includes DrmInfo information;
in response to the series of data packets including the DrmInfo information, determining the state of the video data is the encrypted state; and
in response to the series of data packets not including the DrmInfo information, determining the state of the video data is not encrypted state.

8. The method according to claim 7, further comprising:
in response to the state of the streaming media file being not encrypted state, directly decoding the video data without sending the video data to the trusted execution environment; and playing the decoded video data.

9. The method according to claim 7, further comprising:
in response to the state of the video data being not encrypted state, decoding the video data; and playing the decoded video data.

10. The method according to claim 7, wherein the DrmType information is located in metadata of a media container file.

11. The method according to claim 7, further comprising:
after determining the streaming media file is encrypted, sending a request for a key management system associated with a key for encryption of the streaming media file to the server.

12. The method according to claim 7, wherein the decryption module is configured in the middleware of the display apparatus, and the decoder is configured in a chip of the display apparatus.

* * * * *